(12) United States Patent
Cameron et al.

(10) Patent No.: US 8,154,544 B1
(45) Date of Patent: Apr. 10, 2012

(54) USER SPECIFIED CONTACT DEFORMATIONS FOR COMPUTER GRAPHICS

(75) Inventors: Gordon Cameron, Berkeley, CA (US); Robert H. Russ, Oakland, CA (US); Adam Woodbury, San Francisco, CA (US)

(73) Assignee: Pixar, Emeryville, CA (US)

( * ) Notice: Subject to any disclaimer, the term of this patent is extended or adjusted under 35 U.S.C. 154(b) by 894 days.

(21) Appl. No.: 12/180,383

(22) Filed: Jul. 25, 2008

Related U.S. Application Data

(60) Provisional application No. 60/953,974, filed on Aug. 3, 2007.

(51) Int. Cl.
*G06T 15/00* (2006.01)
(52) U.S. Cl. .................. 345/419; 345/473; 345/655
(58) Field of Classification Search .................. 345/419, 345/473, 655
See application file for complete search history.

(56) References Cited

OTHER PUBLICATIONS

Funck et al. "Elastic Secondary Deformations by Vector Field Integration" Proceedings of the fifth Eurographics symposium on Geometry processing, Jul. 2007, pp. 5-7.*
Harrison, J. and Forsey, D., "A Kinematic Model for Collision Response ", "Eurographics, Proceedings of the Eurographics Workshop in Oslo, Norway", Sep. 17, 1994, pp. 120, Publisher: Springer-Verlag Wein, Published in: New York, US.
Harrison, J., "A Kinematic Model for Collision Response ", Apr. 1994, Publisher: University of British Columbia, Department of Computer Science, Published in: Vancouver, Canada.

\* cited by examiner

*Primary Examiner* — Xiao M. Wu
*Assistant Examiner* — Maurice L McDowell, Jr.
(74) *Attorney, Agent, or Firm* — Law Office of Jonathan Hollander PC

(57) ABSTRACT

An embodiment of the invention creates contact deformations in objects by combining two deformations. A collider contacting an object defines a primary deformation that modifies at least a portion of the object in contact with the collider. A secondary deformation based at least in part on user-provided parameters is added in the vicinity of the primary deformation to deform nearby portions of the objects that are not in contact with the collider, providing an aesthetic contact effect. A secondary deformation specification defines the general shape of the secondary deformation. The secondary deformation specification is associated with a location based on the location of the primary deformation. In an embodiment, the modification of the object due to the secondary deformation specification is modulated by attributes of the collision points, the primary deformation, user-specified weightings, and/or weight maps.

31 Claims, 6 Drawing Sheets

USER SPECIFIED CONTACT DEFORMATIONS FOR COMPUTER GRAPHICS

BACKGROUND

The present invention relates to the field of computer graphics, and in particular to methods and apparatus for specifying contact deformations of computer graphics objects. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Contact between objects is natural in the real world but is often avoided in three-dimensional computer graphics and animation. One reason for this is the difficulty in modeling the deformations of soft objects due to collisions. Collision simulations can simulate the deformations of soft objects in response to collisions; however, these simulations are often time-consuming, especially if they take into account features such as volume preservation, ballistics, bidirectional deformation feedback cycles between objects, and changes in deformation over time.

Computer graphics animators often prefer to work interactively, making incremental changes to an object, observing the results, and then making further changes until they are satisfied with the aesthetics of the object. Because accurate collision simulations are so time-consuming to execute, animators often must wait minutes or hours to observe the results of their changes. This disrupts the animators' interactive workflow and makes fine-tuning the aesthetics of soft-body collisions a frustrating and time-consuming process. As a result, animators often make acting decisions that minimize or eliminate contact between deformable objects, such as character models, and their environment. This makes the animation look detached from its environment.

Therefore, there is an unmet need for a system and method of interactively deforming objects in response to collisions and contact. There is also an unmet need for the system and method to give users fine control over the shape and other aesthetic characteristics of the contact deformation of an object. There is also an unmet need for a system and method of interactively deforming objects to be applicable to a wide variety of different types of objects and collisions.

SUMMARY

An embodiment of the invention creates contact deformations in objects by combining two types of deformations. First, a collider object is manipulated to contact or penetrate into an object. In response to the collider object, a collision response system moves or deforms the surface of the object so that the surface of the object does not penetrate within the collider object. This deformation of the object is referred to as a primary deformation. A secondary deformation based at least in part on user-provided parameters is added in the vicinity of the primary deformation to deform nearby portions of the objects that are not in contact with the collider, providing an aesthetic contact effect.

In an embodiment, a user-specified secondary deformation specification defines the general shape of the secondary deformation. The secondary deformation specification may be specified using any technique for specifying three-dimensional deformations, including a three-dimensional object, a height field or displacement map, or a deformation cross-section. The secondary deformation specification may be symmetrical with reference to one or more axes in cartesian, polar, spherical, or any other coordinate system.

In an embodiment, the secondary deformation specification is associated with a location based on the location and optionally other attributes of the primary deformation. An embodiment of the invention identifies a portion of the object covered by the secondary deformation specification in the vicinity of the secondary deformation location. The secondary deformation specification is used to modify a portion of the object within this coverage. In an embodiment, this portion of the object excludes portions of the object in contact with the collider object.

In an embodiment, the amount of displacement of the object points due to the secondary deformation specification is modulated by attributes of the collision points, the primary deformation, user-specified weightings, and/or one or more weight maps.

BRIEF DESCRIPTION OF THE DRAWINGS

The invention will be described with reference to the drawings, in which.

In the drawings, identical reference numbers in different drawings indicate identical components.

DETAILED DESCRIPTION

An embodiment of the invention deforms creates contact deformations in objects by combining two types of deformations. First, a collider object is manipulated to contact or penetrate into an object. In response to the collider object, a collision response system moves or deforms the surface of the object so that the surface of the object does not penetrate within the collider object. This deformation of the object is referred to as a primary deformation. Second, a secondary deformation modifies the surface of the object so that points near the contact point with the collider object are bulged towards or away from the surface. The general shape of the secondary deformation may be specified by a user.

Figure 1:
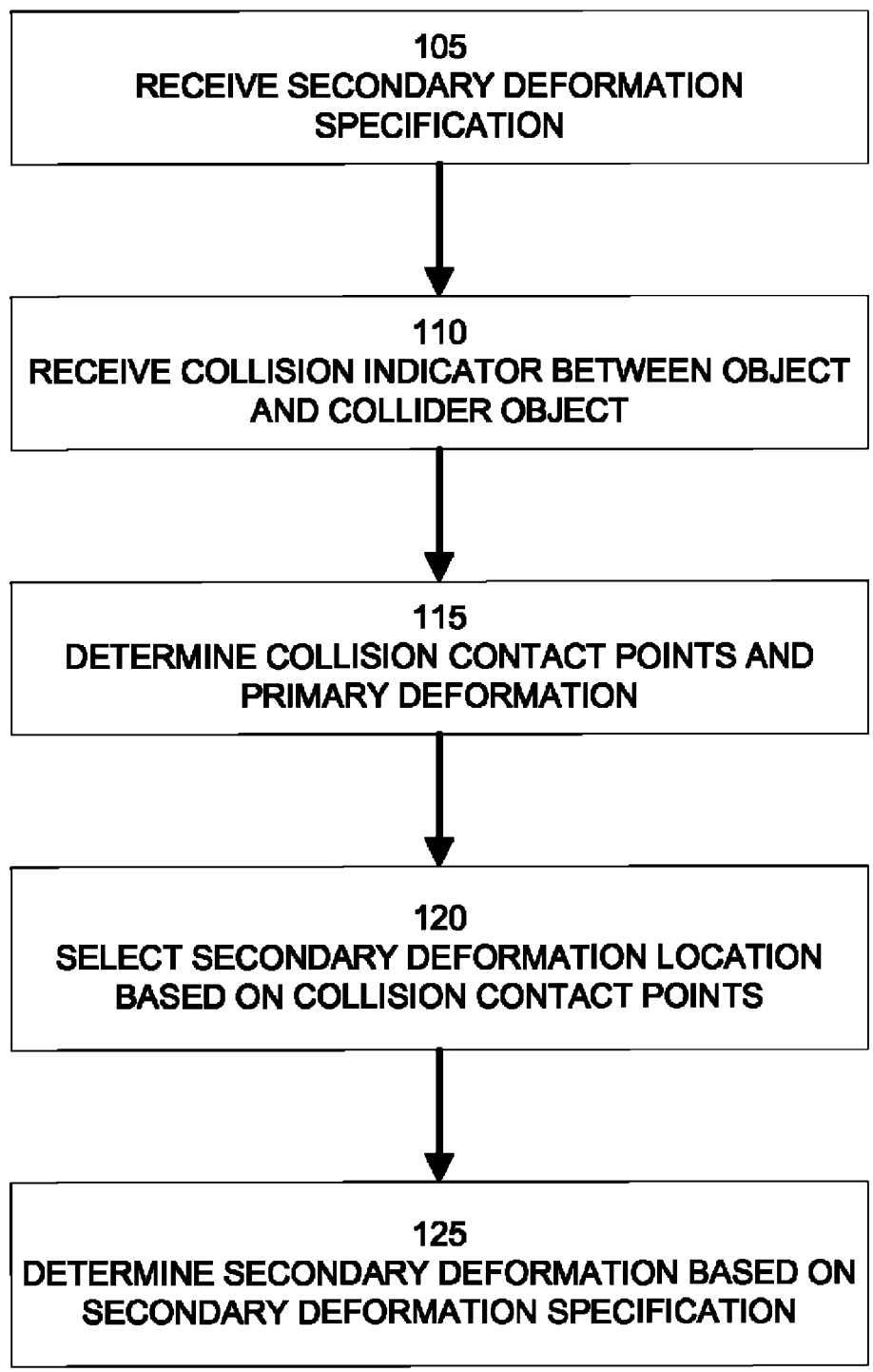
FIG. 1 illustrates a method for creating user-specified contact deformations according to an embodiment of the invention.

FIG. 1 illustrates a method 100 for creating user-specified contact deformations according to an embodiment of the invention. Step 105 receives a secondary deformation specification. In an embodiment, a secondary deformation specification is provided by a user or associated with a model. The secondary deformation specification specifies the general shape of contact deformations with all or a portion of a model. As described in detail below, this general shape of contact deformation may be modified or modulated by factors associated with specific contact deformations, collider objects, and local attributes of the model.

In an embodiment, the secondary deformation specification may be specified using any technique for specifying three-dimensional deformations, including a three-dimensional object, a height field or displacement map, or a deformation cross-section. The secondary deformation specification may be defined with reference to one or more axes in cartesian, polar, spherical, or any other coordinate system. In an embodiment, the secondary deformation specification may be symmetrical with reference to one or more axes in cartesian, polar, spherical, or any other coordinate system. In still a further embodiment, the position and/or orientation of one or more axes used to define the secondary deformation specification may be specified using one or more parameters.

Step 110 receives an indication of a collision between a collider object and an object to be deformed by a collision. In an embodiment, a collision detection system monitors the arrangement of collider objects with respect to other objects and detects when a collider object contacts or penetrates an object.

In an embodiment, colliders can be any arbitrary shape, such as an arbitrary mesh, spheres, capsules, cubes, and ellipsoids. An object itself may be used as a collider. Alternatively, a simplified version of an object or an approximation of the object can be used as a collider for the object. Additionally, colliders can exist in a scene independently of objects. Colliders may be visible during rendering, for example if an object uses itself as its collider, or may be invisible during rendering, for example if an approximation of an object is used as the collider for an object.

In a further embodiment, colliders are associated with articulated character models, such as a separate collider for the head, torso segments, and each segment of the limbs. These associated proxy colliders automatically move with their associated portions of the character model. These proxy colliders can be used to emulate self-collision within a character model, such as when a character model's arm contacts its belly, as well as contact between different character models. In this embodiment, when a portion of the character model collides with itself or another object, it is the associated proxy collider, rather than the portion of the character model, that is used as a collider to determine the primary deformation and to modulate the secondary response deformation. By using proxy colliders, collision computations are greatly simplified and bidirectional contact deformations are emulated without having to resolve complex bidirectional deformation feedback situations.

Step 115 determines a primary deformation of an object in response to a collision with a collider object. In an embodiment, a collision response system forms the primary deformation by first checking for object (collidee) and collider intersections. For any points of the object that fall on or within the collider, the collision response system tags these points as contact points and stores information about the contact points and the collision. The collision response system also estimates the direction and magnitude that the contact points should be pushed, for example using metrics such as normal vectors and distances between objects and colliders. The contact points are pushed out of the way, so as to fall outside of the collider and any neighboring points on the object are smoothly ramped in. In an embodiment, the primary deformation at least approximately follows the shape of a portion of the collider.

In this embodiment, the collision response system that forms the primary deformation does not take into account effects such as real volume preservation, ballistics, deformation feedback cycles between objects, and changes in deformation over time. This allows the collision response system to operate at interactive speeds.

To provide increased aesthetic control and more realistic looking contact deformations, a secondary response deformation further modifies the surface of the object to bulge in response to the collider.

Step 120 selects a secondary deformation location based on the collision contact points. In an embodiment, step 120 selects the center of the set of collision contact points as the origin or location of the secondary deformation. In another embodiment, step 120 selects the deepest or most displaced collision contact point as the location of the secondary deformation. In still further embodiments, a combination of these two factors are used to determine the location of the secondary deformation.

Step 125 determines a secondary deformation based on the secondary deformation specification received in step 105. In an embodiment, the secondary deformation specification is positioned at the secondary deformation location determined in step 120. In an embodiment, the secondary deformation specification is then scaled or modulated according to attributes of the collision points. For example, the secondary deformation specification may be scaled according to the maximum displacement of a collision point, such that large displacements of collision points result in larger secondary deformations. In another example, the area of effect of a secondary collision specification may be scaled according to the size of the portion of the object in contact with the collider. The size of the portion of the object in contact with the collider may be expressed in terms of surface area, volume, or any other type of metric. The secondary deformation specification may be scaled in one or more dimensions based on the attributes of the collision points.

In an embodiment, step 125 applies the scaled or modulated secondary deformation specification to the object in the vicinity of the primary deformation. In an embodiment, the scaled secondary deformation specification defines the general shape of the surface bulge around collision contact points. In an embodiment, points on an object that are not in contact with a collider but are covered by a portion of the scaled secondary deformation specification are displaced according to the secondary deformation specification.

In a further embodiment, one or more weight maps can be used to further modulate the secondary deformation specification. Weight maps can be assigned to objects or portions thereof to weight or modulate the influence of the secondary deformation specification. For example, a portion of an object representing a character's hand may be associated with a weight map having small values. This reduces the amount of bulging from the secondary response deformation, so that the character's hand appears rigid, for example due to bones. In another example, a portion of an object representing a character's belly may be associated with a weight map having large values. This increases the amount of bulging from the secondary response deformation, so that the character's belly appears soft and flexible, for example due to body fat. In an embodiment, a weight map allows the secondary deformation specification to be scaled or modulated as a function of the location on an object, independent of any attributes of nearby collision points.

In further embodiments, additional user-defined deformation parameters may be used to modify the effect of the secondary deformation specification on objects. For example, a user-defined deformation parameter may further scale or modulate the displacement of secondary deformation specification for one or more selected collision points, colliders, or objects, allowing users to fine tune the effect of the secondary deformation. In another example, a user-defined deformation parameter may scale the size or area of coverage of the secondary deformation specification, allowing users to change the influence of the collider on nearby portions of the object. In still another example, a user-defined deformation parameter can specify a directional bias, which scales or orientates the secondary deformation specification in a specific direction.

In an embodiment, method 100 may be repeated to specify multiple user-defined contact deformation in objects. In another embodiment, multiple user-defined contact deformations may be processed by performing steps 110 to 125 of method 100 in parallel for each collision point. In this embodiment, the secondary deformations from multiple nearby collision points may act cumulatively on the object. For example, a point in the vicinity of two or more collision points may be displaced by two or more scaled secondary deformation specifications.

Figure 2A:
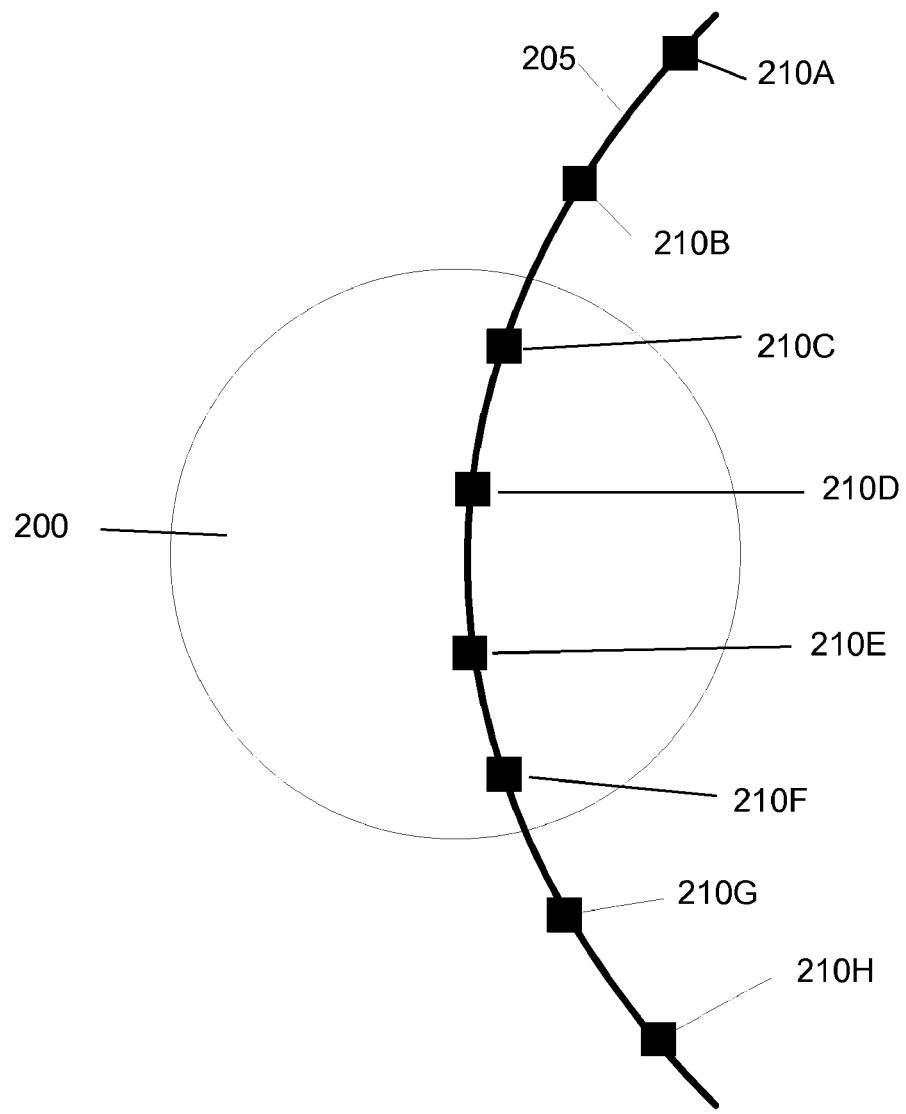
FIGS. 2A-2D illustrate an example application of a method for adding user-specified contact deformations according to an embodiment of the invention.

FIGS. 2A-2D illustrate an example application of a method for adding user-specified contact deformations according to an embodiment of the invention. FIG. 2A illustrates a collider object 200 in contact with the surface 205 of an object. The surface 205 of the object includes surface points 210a to 210h. In this example, it is assumed that the right side of the surface 205 is the interior of the object; however, embodiments of the invention are also applicable to colliders located within the interior of an object that push the surface of the object outward.

Figure 2B:
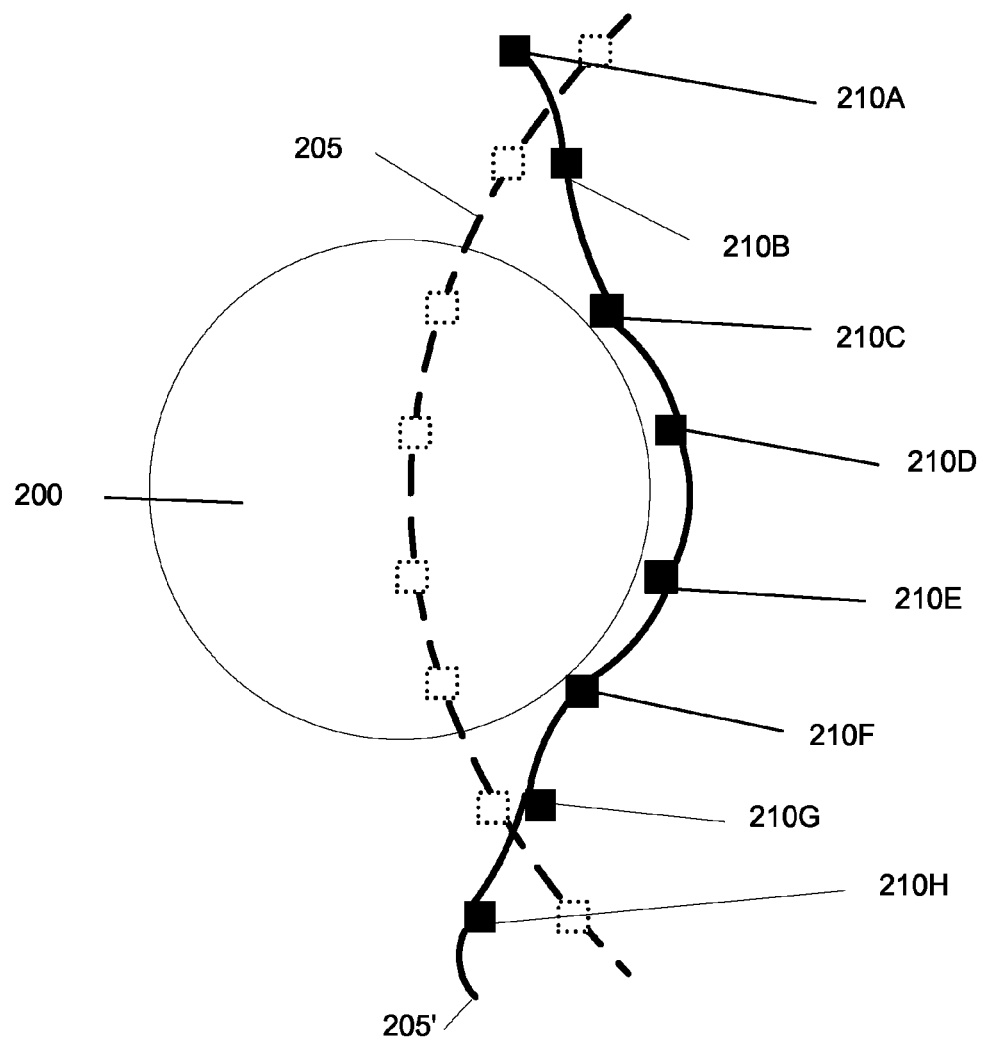

In response to receiving an indication of the collision between collider object 200 and surface 205, an embodiment of the invention first determines a primary deformation of the surface 205, as described in step 115. FIG. 2B illustrates an example primary deformation of the surface 205 of an object in response to the contact with collider object 200. In this example, surface points 210c, 210d, 210e, and 210f in contact with collider object 200 have been displaced to fall outside the collider object 200. As a result, the surface 205 shown in FIG. 2A has been deformed to create modified surface 205'. Surface points 210a, 210b, 210g, and 210h do not contact the collider object 200, but may be displaced to maintain the smoothness of surface 205.

Figure 2C:
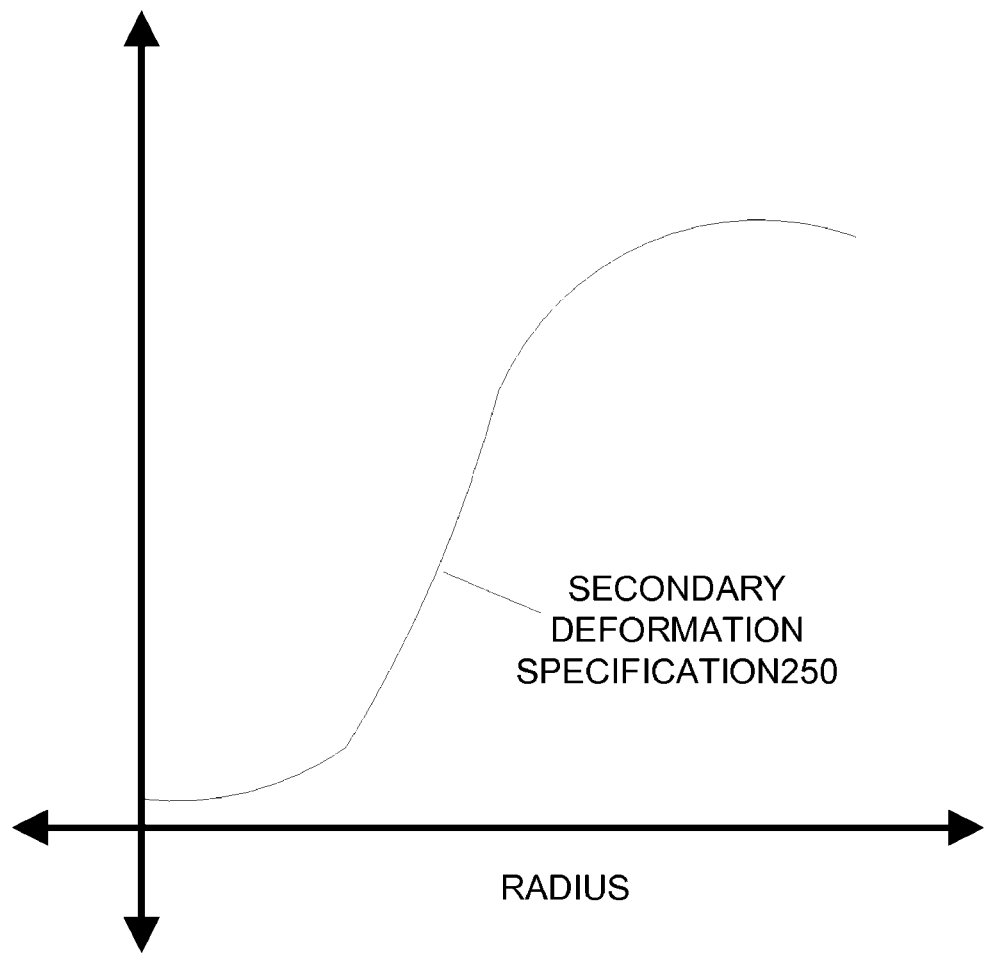

FIG. 2C illustrates an example secondary deformation specification 250. In this example, the secondary deformation specification 250 may be specified as a cross-section profile function, using a Bezier curve or any other type of line or curve. In this example, the curve is swept around an axis to define the three-dimensional shape of the secondary response deformation. In other embodiments, the user can specify an asymmetric profile function, so that the secondary deformation is not radially symmetric.

As described above, the secondary deformation specification 250 is positioned at the collision or contact area of the object and scaled according to attributes of the collision points and/or weights associated with the object itself. The scaled secondary deformation specification is then applied to surface points or other geometric attributes of the object to provide a secondary deformation of the surface.

Figure 2D:
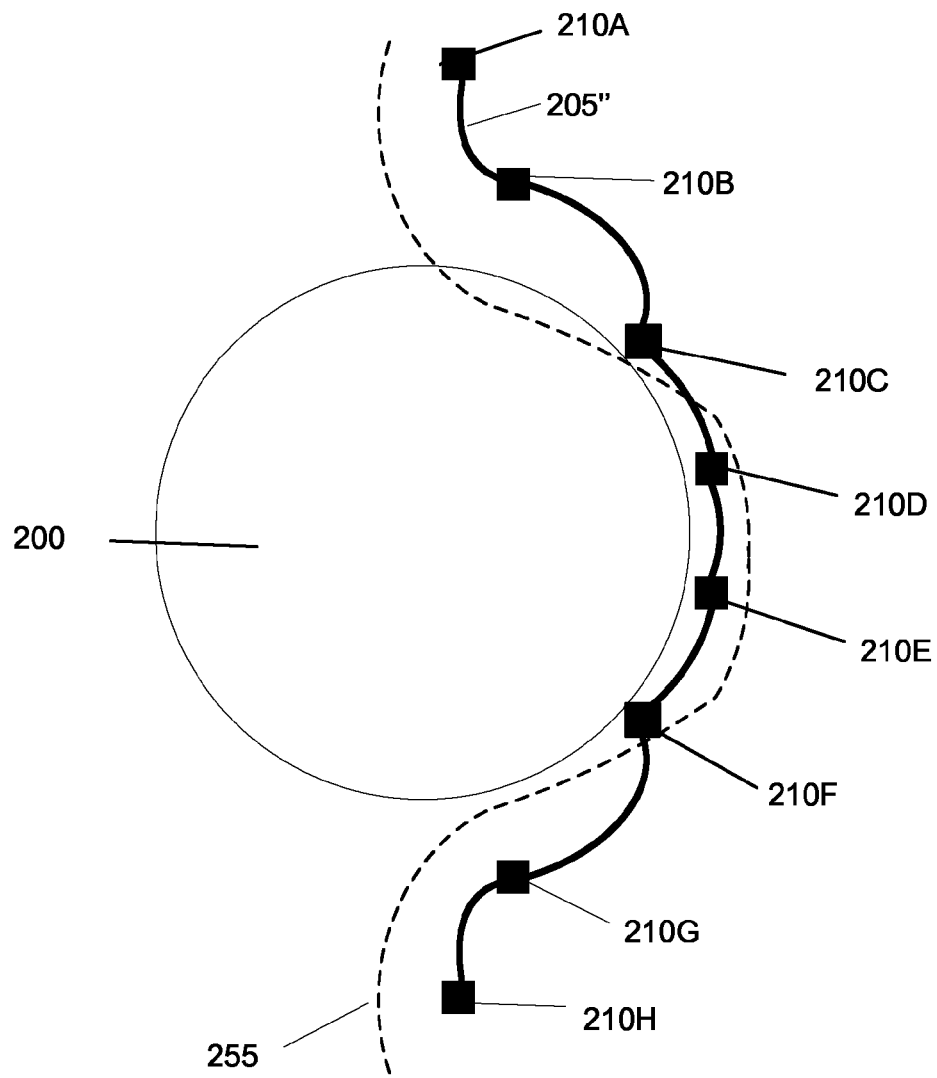

FIG. 2D illustrates an example of a scaled secondary deformation specification 255 applied to the surface 205' to create a further deformed surface 205". In this example, the scaled secondary deformation specification 255 is applied to displace surface points 210a, 210b, 210g, and 210h. The deformation of surface 205 to surface 205" in response to collider object 200 is the combination of the primary deformation applied to surface points in contact with the collider object, such as surface points 210c, 210d, 210e, and 210f, and the secondary deformation applied to surface points near the collision points that are covered by the scaled secondary deformation specification, such as surface points 210a, 210b, 210g, and 210h.

Embodiments of the invention can be utilized in a number of different applications. First, animators can dent or squish objects at desired contact points to interactively create and control contact deformations. This allows animators to model contact between objects in an easy and aesthetically pleasing way. In a typical application, an animator specifies contact deformations at two or more keyframes. For each intermediate frame, an animation software or hardware system interpolates the contact parameters, such as secondary deformation specifications and an optional additional secondary deformation weightings, from two or more adjacent keyframes. At each intermediate frame, an embodiment of the invention determines a contact deformation using the interpolated contact parameters. In an embodiment, the contact deformations for intermediate frames are determined independently of each other (i.e. without any history or state maintained between frames), aside from any interdependence of the interpolated contact parameters. Because of this property, this embodiment of the invention produces static contact deformations quickly and efficiently, often at interactive frame rates.

Additionally, embodiments of the invention can be used to deform lattices, which are objects with internal structure. The deformation of the lattice in turn controls the shape of more complicated objects. This allows animators to deform complicated objects in an intuitive manner. In another application, embodiments of the invention can be used to deform an object due to other objects inside the object. This can be used to show cheeks bulging due to food in a character's mouth. In this application, the deformation may be inverted, so that the primary deformation bulges outwards and/or the secondary deformation response bulges inward. In yet another application, a height field or ground map can be used as a collider to implement objects' collisions and resulting deformations due to contact with the ground.

In further applications, an embodiment of the invention can be used to fix or cover visual errors due to other portions of the animation system. For example, if one object inadvertently passes through another object, a collider can be used to easily push the surface of one or both of these objects out of the way. In another example, if a portion of a cloth movement simulation produces erroneous results, such as a kink or unwanted folds, a collider can be used to push the cloth to the desired position or to further guide the cloth simulation.

In an additional application, an embodiment of the invention can be used as a preview or input to a more complicated simulation system. For example, an animator can use an embodiment of the invention to specify a desired contact deformation at the end of collision between two objects. This desired contact deformation and the parameters used to create it can then be provided to a more complex contact and collision simulation to determine the dynamic, time-varying deformation of the objects from the time they initially collide until the desired contact deformation is reached.

Figure 3:
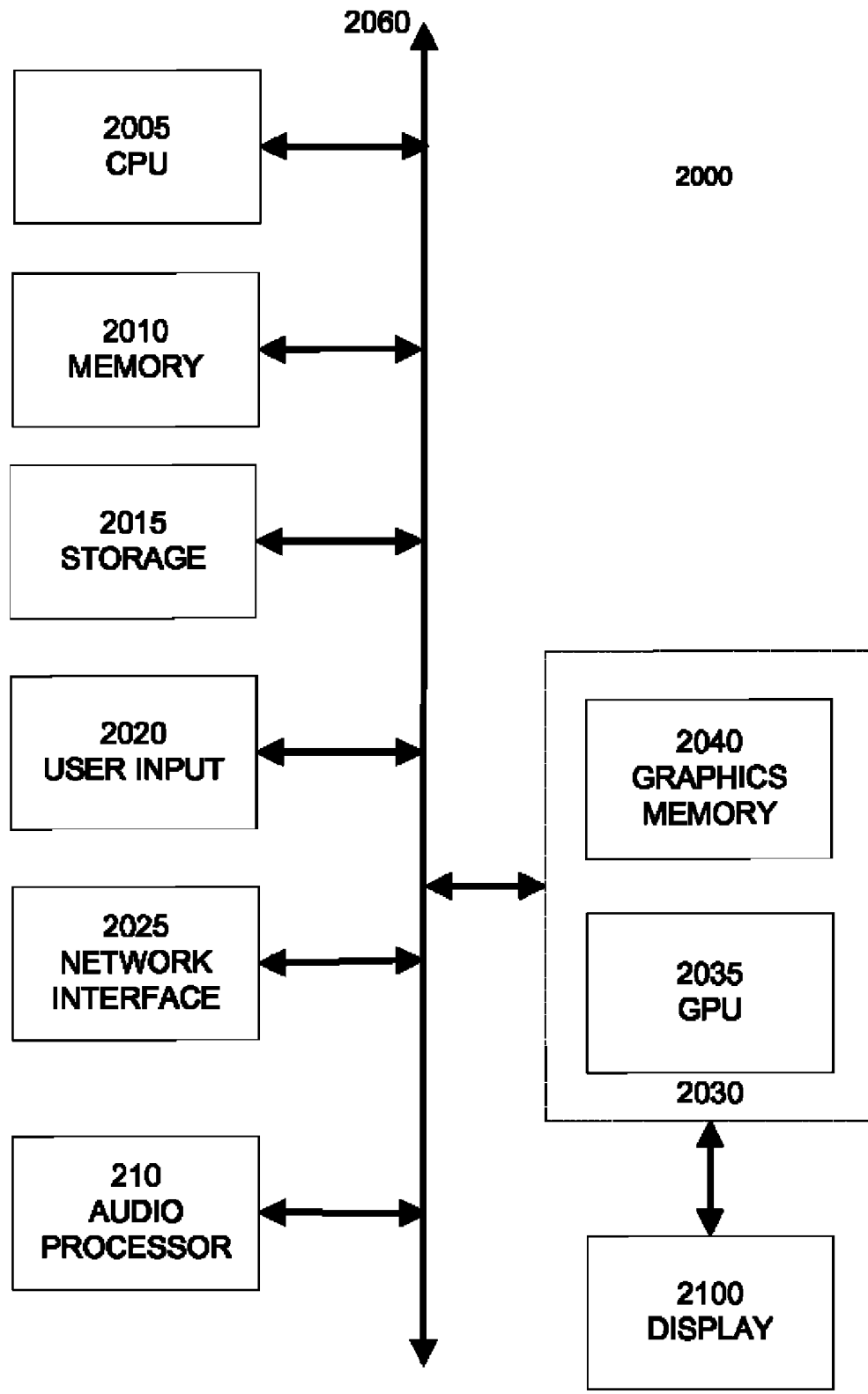
FIG. 3 illustrates a computer system suitable for implementing an embodiment of the invention.

FIG. 3 illustrates a computer system suitable for implementing an embodiment of the invention. FIG. 3 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Computer-readable storage devices and media 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to renderfarm or set of server computers, each similar to computer system 2000, via the network interface 2025 or storage 2015. The renderfarm generates one or more rendered images of the scene using the provided instructions and/or data. These rendered images are returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 2035 can further include one or more programmable execution units capable of executing shader programs. GPU 2035 can be comprised of one or more graphics processing unit cores.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable medium including instructions in non-transitory form that are adapted to direct a computer to perform an operation, the operation comprising: receiving positions of an object and a collider, such that at least a first portion of the object intersects the collider; identifying the first portion of the object intersecting the collider; modifying the first portion of the object intersecting the collider to form a primary deformation, wherein the primary deformation at least approximately follows the shape of a portion of the collider; receiving a secondary deformation specification specifying a shape of secondary response deformation; and modifying a second portion of the object according to at least the secondary deformation specification to form a secondary deformation; wherein the positions of the object and the collider are determined from an interpolation between control knots.

2. The non-transitory computer-readable medium of claim 1, the computer-readable medium comprising: rendering the object including the first and second portions of the object to create at least a portion of a rendered image.

3. The non-transitory computer-readable medium of claim 1, the computer-readable medium comprising: storing an object description including the first and second portions of the object.

4. The non-transitory computer-readable medium of claim 1, wherein modifying the second portion of the object comprises displacing points in the second portion of the object according to at least the secondary deformation specification.

5. The non-transitory computer-readable medium of claim 4, wherein the displacement of points is modulated by the depth of the primary deformation.

6. The non-transitory computer-readable medium of claim 4, wherein the displacement of points is modulated by the size of the primary deformation.

7. The non-transitory computer-readable medium of claim 6, wherein the size of the primary deformation is based on a surface area of the portion of the object intersecting the collider.

8. The non-transitory computer-readable medium of claim 6, wherein the size of the primary deformation is based on a volume of the portion of the object intersecting the collider.

9. The non-transitory computer-readable medium of claim 4, wherein the displacement of points is modulated by a weight map associated with the object.

10. The non-transitory computer-readable medium of claim 4, wherein displacing points in the second portion of the object according to at least the secondary deformation specification comprises: receiving at least one user-defined deformation parameter; and modifying the secondary deformation specification based on the user-defined parameter.

11. The non-transitory computer-readable medium of claim 10, wherein the user-defined deformation parameter is selected from a group consisting of: a displacement scaling parameter; a size or area scaling parameter; and a directional bias parameter.

12. The non-transitory computer-readable medium of claim 1, wherein the secondary deformation specification includes a cross-section curve.

13. The non-transitory computer-readable medium of claim 1, wherein the secondary deformation specification includes a radially-defined function.

14. The non-transitory computer-readable medium of claim 13, wherein the radially-defined function is radially symmetric.

15. The non-transitory computer-readable medium of claim 1, wherein the collider is associated with a third portion of the object.

16. The non-transitory computer-readable medium of claim 1, wherein the collider is associated with a second object.

17. The non-transitory computer-readable medium of claim 16, wherein the collider is adapted to follow movement of the second object.

18. The non-transitory computer-readable medium of claim 1, wherein the collider is associated with a height map.

19. The non-transitory computer-readable medium of claim 1, wherein the secondary deformation is independent of time.

20. The non-transitory computer-readable medium of claim 1, wherein the secondary deformation is independent of a secondary deformation in a previous frame.

21. The non-transitory computer-readable medium of claim 1, wherein the second portion of the object includes a portion of the object not in contact with the collider.

22. A non-transitory computer-readable medium including instructions in non-transitory form that are adapted to direct a computer to perform an operation, the operation comprising:
receiving a first collision point and a second collision point between a first object and at least one collider;
modifying a first portion of the first object including the first and second collision points to form a primary deformation, wherein the primary deformation at least approximately follows the shape of a portion of the collider;
receiving a secondary deformation specification specifying a shape of secondary response deformation;
determining a first secondary deformation location based on the first collision point and a second secondary deformation location based on the second collision point;
associating a first instance of the secondary deformation specification with the first secondary deformation location and a second instance of the secondary deformation specification with the second secondary deformation location; and
modifying a second portion of the object according to at least the first and second instances of secondary deformation specification to form a secondary deformation;
wherein the second portion of the object includes a portion of the object not in contact with the collider.

23. The non-transitory computer-readable medium of claim 22, wherein modifying the second portion of the object comprises:
displacing the second portion of the object according to at least the first instance of the secondary deformation specification in the vicinity of the first secondary deformation location and according to at least the second instance of the secondary deformation specification in the vicinity of the second secondary deformation location.

24. The non-transitory computer-readable medium of claim 23, wherein the displacement of the second portion of the object is modulated by at least one depth of the primary deformation.

25. The non-transitory computer-readable medium of claim 23, wherein the displacement of the second portion of the object is modulated by a weight map associated with the object.

26. The non-transitory computer-readable medium of claim 22, wherein the second portion of the object includes at least one object point modified by both the first and second instances of the secondary deformation specification.

27. The non-transitory computer-readable medium of claim 22, wherein the secondary deformation specification includes a cross-section curve.

28. The non-transitory computer-readable medium of claim 22, wherein the secondary deformation specification includes a radially-defined function.

29. The non-transitory computer-readable medium of claim 28, wherein the radially defined function is radially symmetric.

30. The non-transitory computer-readable medium of claim 22, wherein the secondary deformation is independent of time.

31. The non-transitory computer-readable medium of claim 22, wherein the secondary deformation is independent of a secondary deformation in a previous frame.

* * * * *